United States Patent [19]

Yasuda et al.

[11] Patent Number: 5,377,007
[45] Date of Patent: Dec. 27, 1994

[54] INTERFEROMETRIC SURFACE INSPECTION MACHINE DESIGNED TO SUPPORT AN ELEMENT ON THE SIDE TO BE INSPECTED

[75] Inventors: Kenji Yasuda; Masami Yoneda; Shigenori Ohi; Kenichi Noguchi, all of Omiya, Japan

[73] Assignee: Fuji Photo Optical Co., Ltd., Omiya, Japan

[21] Appl. No.: 50,622

[22] Filed: Apr. 22, 1993

[30] Foreign Application Priority Data

Apr. 23, 1992 [JP] Japan .................................. 4-129301
Jul. 13, 1992 [JP] Japan .................................. 4-207062

[51] Int. Cl.$^5$ .............................................. G01B 9/02
[52] U.S. Cl. ...................................................... 356/359
[58] Field of Search ............... 356/359, 360, 124, 244; 359/819

[56] References Cited
U.S. PATENT DOCUMENTS 5,127,734  7/1992  Ohi et al. .................... 356/359
5,276,502  1/1994  Ohi ............................. 356/244

Primary Examiner—Samuel A. Turner
Assistant Examiner—Russell C. Wolfe
Attorney, Agent, or Firm—Oblon, Spivak, McClelland, Maier, & Neustadt

[57] ABSTRACT

Disclosed herein is an interferometric surface inspection machine which is arranged to facilitate the inspection of finished spherical lens surfaces, and which essentially includes: a surface plate formed with a through light guide opening in a predetermined position; an up-down guide means suspended from the lower side of the surface plate; an interferometer liftably supported on the up-down guide means and having a reference lens with a reference surface thereof disposed on the side of the light guide opening and in face to face relation with said light guide opening; and a lens mount portion adjustably located in a predetermined position above the light guide opening in the surface plate and adapted to support peripheral edge portions of a spherical lens element on the side of the lens surface to be inspected.

7 Claims, 6 Drawing Sheets

F I G. 1
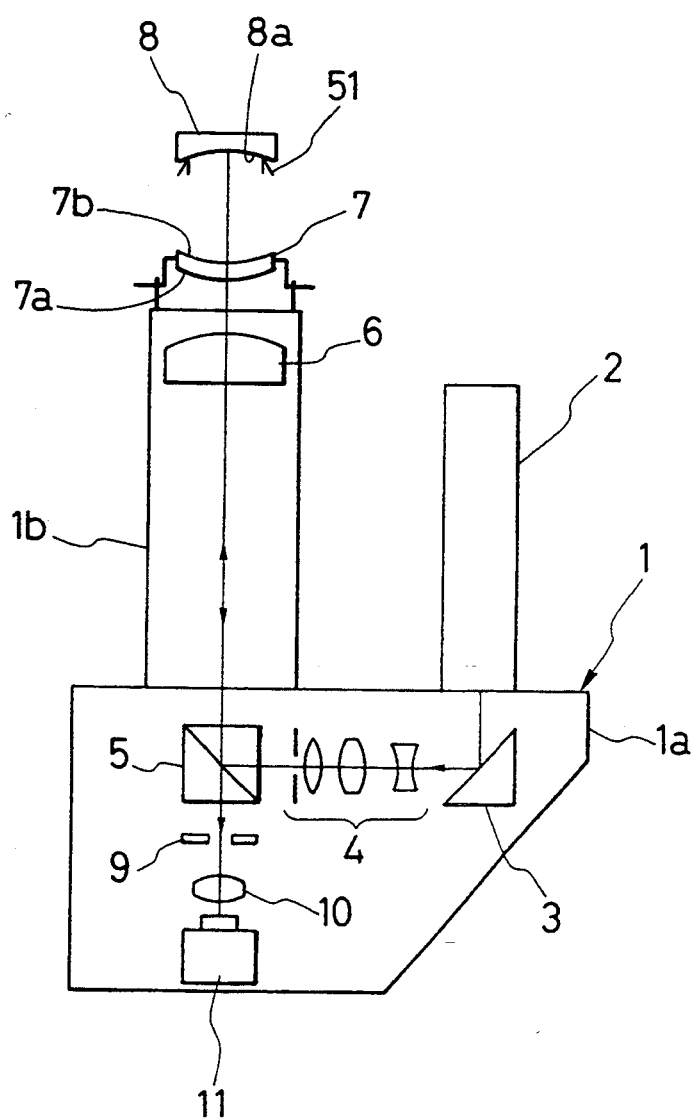

INTERFEROMETRIC SURFACE INSPECTION MACHINE DESIGNED TO SUPPORT AN ELEMENT ON THE SIDE TO BE INSPECTED

BACKGROUND OF THE INVENTION

1. Field of the Art

This invention relates to an interferometric surface inspection machine for inspecting surface conditions of finished spherical lens elements (hereinafter referred to as "lens specimens") by the use of a laser interferometer.

2. Description of the Prior Art

It has been the general practice in the art to detect the surface irregularities of a finished lens by the use of a test plate, more specifically, by reflecting light on the surface of a lens specimen through a test plate and measuring the number of lines in an interference fringe pattern (normally referred to as the number of Newton's fringes which is formed as a result of interference between reflected light from a reference surface of the test plate with reflected light from the lens surface under testing. In this regard, the simplest way of inspection is to overlay a test plate directly on a lens surface to be inspected, and project light on the test plate to observe with naked eyes the interference fringe which is formed by the two light reflections from the reference surface of the test plate and the lens surface under inspection. However, in such lens surface inspection, the test plate which is placed in direct contact with an inspecting lens surface has to be handled very carefully to avoid damages to both of the contacting surfaces. Especially, on the part of the test plate which is used repeatedly, it is very likely that accumulation of scratches take place on the entire surface of the test plate even from an extremely early time point of the inspection, necessitating replacement of the test plate at a high frequency. In the surface inspection of this sort, there has been another problem that, unless the surfaces of the test plate and lens specimen are cleaned prior to each inspection, accurate observation of the interference pattern may be jeopardized by dust or foreign matter which has crept onto their overlapped surface portions.

In this connection, there has been known, for example, from U.S. Pat. No. 5,127,734, a surface inspection apparatus which permits to inspect a lens surface in a non-contacting state by the use of a laser interferometer. More specifically, the surface inspection apparatus employs a laser generator to project a laser beam on a reference lens through an optical laser beam guide system, reflecting part of the laser beam light on a reference surface of the reference lens and reflecting part of the laser beam, which has passed through the reference lens, on a surface of a lens specimen which is located in face to face relation with the reference lens, and observing the interference fringe which is produced by interference between the two light reflections.

In this manner, in case of a laser interferometer, the surface of a lens specimen is held in non-contacting state with the reference lens during inspection, preventing the above-mentioned problems of the contacting inspection by the use of a test plate in which the overlapped surfaces of the test plate and an inspecting lens specimen, in direct contact with each other, are both vulnerable to damages or flaws. In the above-described prior art which is arranged to irradiate an inspecting lens surface with light projected from above, however, the lens specimen under inspection needs to be supported in position for inspection on the side away from the lens surface under inspection or needs to be clamped in position at its peripheral edge portions. Normally, the lens specimens to be inspected are manufactured with a certain degree of tolerances in thickness and outer diameter, so that it has been imperative for an accurate inspection to make adjustment of the relative positions of the interferometer and the inspecting lens surface each time a new lens specimen is set on a lens mount member for inspection. For this adjustment of relative positions, usually the interferometer proper is moved in the direction of the optical axis, while the lens mount member which supports a lens specimen is moved in a direction perpendicular to the optical axis and at the same time turned relative to the optical axis to correct its inclination if any. Such adjustment of relative positions of the interferometer and the inspecting lens surface has to be carried out for each of the individual lens specimens even if they are of the same kind. The job of pre-adjusting the position of each lens specimen relative to the interferometer is very troublesome and requires meticulous skills, making it extremely difficult to realize automatic surface inspecting operations.

SUMMARY OF THE INVENTION

The present invention contemplates to solve the above-mentioned problems of the prior art, and has as its primary object the provision of an interferometric surface inspection machine which is arranged to inspect the surfaces of spherical lens specimens one after another in a facilitated manner and under the same or uniform conditions.

In accordance with the present invention, in order to achieve the above-stated objective, there is provided an interferometric surface inspection machine which essentially includes: a surface plate formed with a through light guide opening in a predetermined position; an up-down guide means suspended from the lower side of the surface plate; an interferometer liftably supported on the up-down guide means and having a reference lens with a reference surface thereof disposed on the side of the light guide opening and in face to face relation with the light guide opening; and a lens mount portion adjustably located in a predetermined position above the light guide opening in the surface plate and adapted to support peripheral edge portions of a spherical lens element on the side of the lens surface to be inspected.

The above and other objects, features and advantages of the invention will become apparent from the following description and the appended claims taken in conjunction with the accompanying drawings which show by way of example preferred embodiments of the invention.

BRIEF DESCRIPTION OF THE DRAWINGS

In the accompanying drawings:

FIG. 1 is a schematic view of a laser interferometer;

DESCRIPTION OF THE PREFERRED EMBODIMENTS

Figure 2:
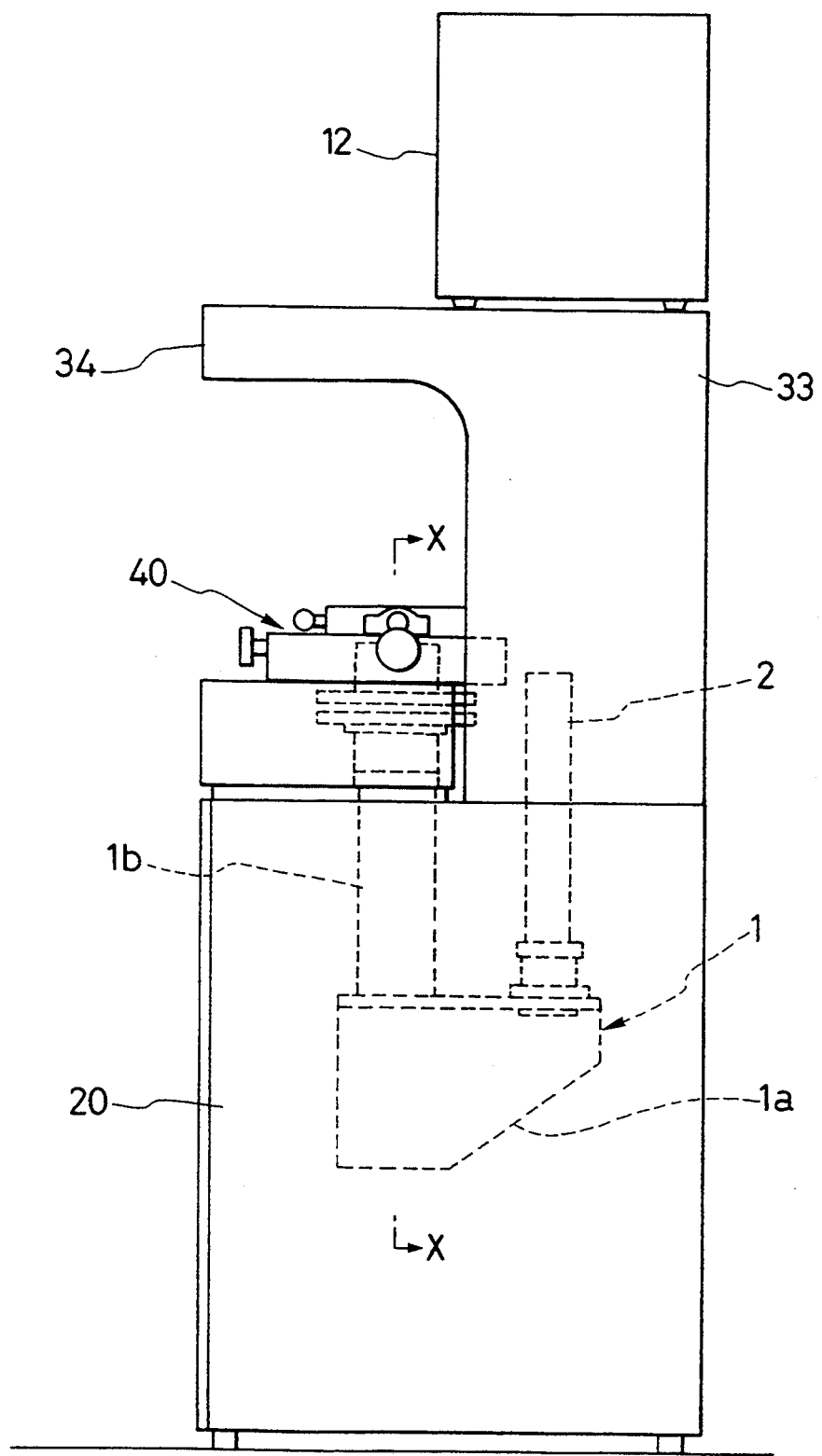
FIG. 2 is a schematic outer view of an interferometric surface inspection machine according to the present invention.

Hereafter, the invention is described more particularly by way of its preferred embodiments with reference to the drawings.

Referring first to FIG. 1, the reference 1 denotes an interferometer with a main casing 1a and a cylindrical casing 1b which is erected on and extended upward from the main casing 1a. The main casing 1a accommodates therein a laser generator 2 like a He—Ne laser which is located in parallel relation with the upright cylindrical casing 1b. Also accommodated in the main casing 1a is an optical beam guide system 4 including a reflecting mirror 3, an expander and a diverger. The laser beam from the laser beam generator 2 is turned 90 degrees by the reflecting mirror 3, and its beam spot diameter is broadened through the optical beam guide system 4 before it is turned again 90 degrees by reflection on a beam splitter 5 toward a collimator lens 6 along the axis of the cylindrical casing 1b or in a direction reverse to the direction of beam projection from the laser beam generator 2 in this particular case. Collimated light from the lens 6 is shed on a reference lens 7 which is located forward of the collimator lens 6.

The reference lens 7 is provided with a spherical reference surface 7b on the side away from its light-incident surface 7a which is covered with an anti-reflection coating. The laser beam which is incident on the reference lens 7 is partly reflected on the reference surface 7b, while a major part of the laser beam is transmitted through the reference lens 7 toward an inspecting surface 8a of a lens specimen 8, which is set in an inspecting position forward of the reference lens 7, and again partly reflected on the inspecting lens surface 8a. The interference, which takes place between the two light reflections from the inspecting lens surface 8a and the reference surface 7b of the reference lens 7, results in formation of an interference fringe of a certain pattern consisting of a number of lines similar to the contour lines of the lens surface under inspection. The light reflections with the interference fringe are passed through the collimator lens 6 and beam splitter 5 and then through a stop 9 and an imaging lens 10 to form an image of the interference fringe on an image pickup means 11. The image pickup means 11 is connected to a monitor 12 to display the picture image of the interference fringe thereon pattern (FIG. 2).

Figure 3:
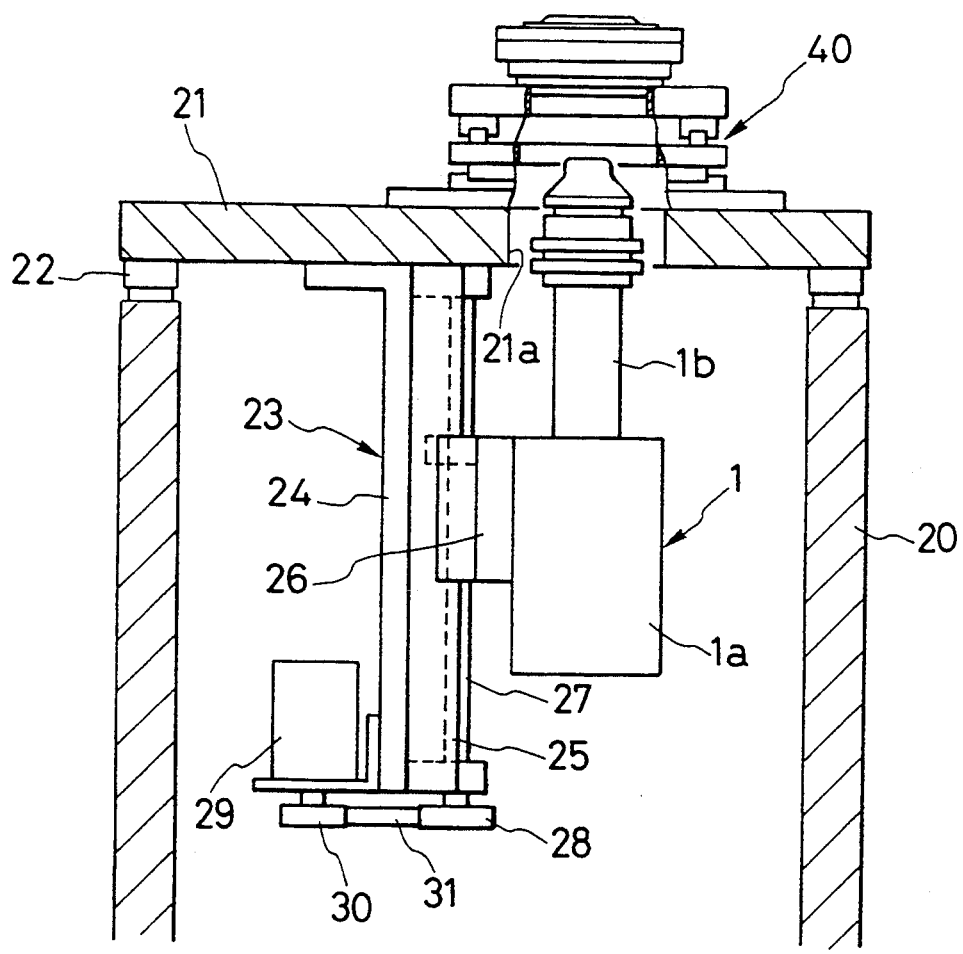
FIG. 3 is a sectional view taken on line X—X of FIG. 2.
Figure 4:
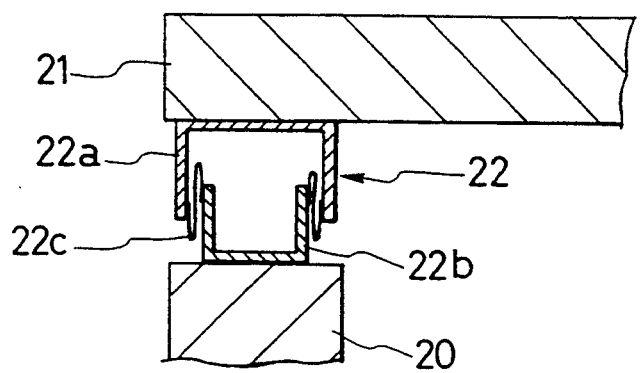
FIG. 4 is a sectional view of a vibration isolator member.
Figure 5:
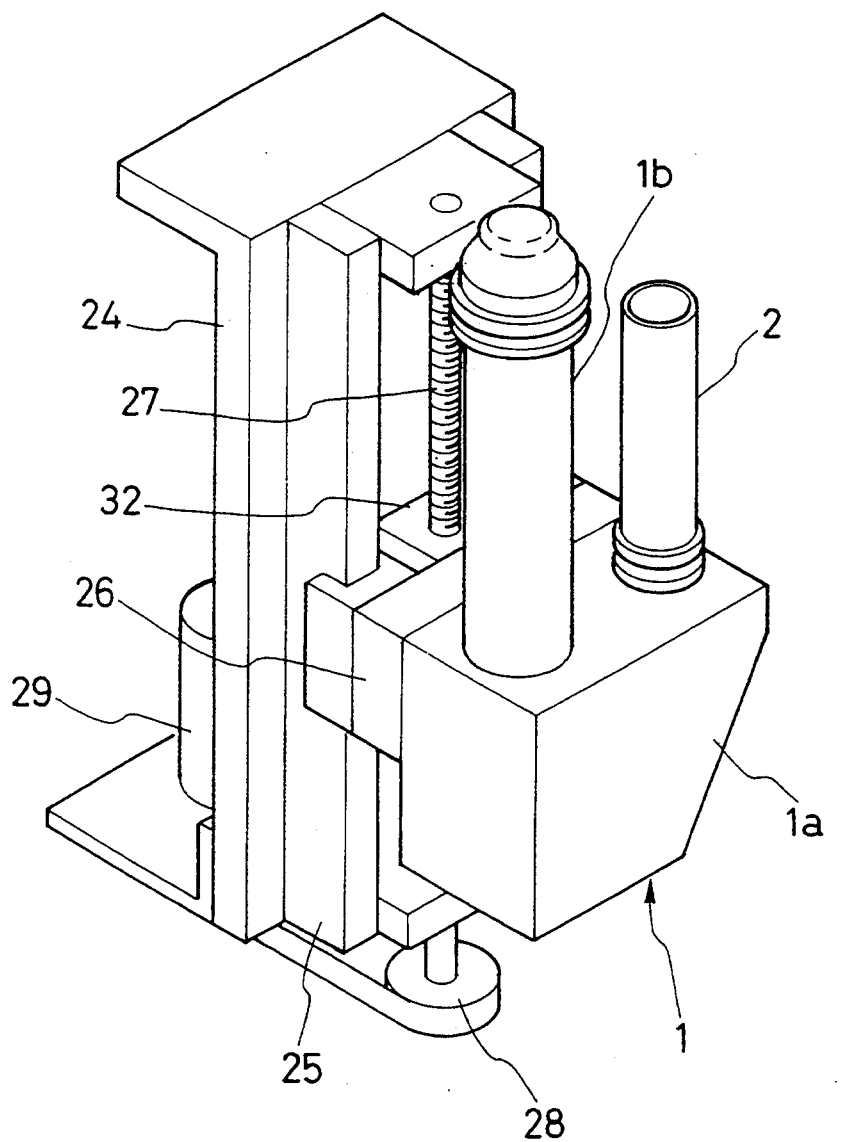
FIG. 5 is a schematic view of an up-down guide mechanism for the interferometer proper.

Referring now to FIGS. 2 and 3, indicated at 20 is a machine frame of an interferometric inspection machine according to the invention. The interferometer 1 proper is mounted internally of the machine frame 20, and a surface plate 21 is securely mounted on top of the machine frame 20. Therefore, the interferometer 1 is located in a substantially closed space in the machine frame. This arrangement contributes to prevent air disturbances in the path of laser light. Vibration isolator members 22 are interposed between the surface plate 21 and the machine frame 20 at four corner portions of the surface plate 21. As shown particularly in FIG. 4, each vibration isolator member 22 is constituted by upper and lower cup members 22a and 22b which are opposingly fixed on the surface plate 21 and machine frame 21, and a flexible membrane 22c which is hermetically provided between the upper and lower cup members 22a and 22b which internally define a compressed air chamber. Accordingly, the surface plate 21 can be maintained in a level state by suitably adjusting the air pressures in the respective compressed air chambers which prevent transmission of vibrations from the machine frame 20 to the surface plate 21.

Suspended from the lower side of the surface plate 21 is an up-down guide means 23 on which the interferometer 1 is vertically movably supported for movements toward and away from the surface plate 21. As clear from FIG. 3, the up-down guide means 23 is provided with a pair of guide rails 25 on a plate member 24 which is fixed to the lower side of the surface plate 21. The plate member 24 further supports thereon a lifting block 26 which is vertically movable along the guide rails 25, and a screw shaft 27 which is extended parallel with the guide rails 25 and coupled with a pulley 28 at the lower end thereof. A rotational drive means 29 like a reversible pulse motor is mounted on the plate member 24 on the other side away from the guide rails 25. The drive means 29 is coupled with a pulley 30, and a timing belt 31 is passed around the pulley 30 and the pulley 28 on the part of the screw shaft 27. Further, the screw shaft 27 is threaded into a nut member 32 which is secured to the lifting block 26. Consequently, upon actuating the drive means 29, the pulley 30 is put in rotation, which is then transmitted to the pulley 28 through the timing belt 31 to turn the screw shaft 27 about its axis, moving the lifting block 26 into either an upper or lower position. Upon stopping or deactuating the drive means 29, the lifting block 26 is retained fixedly in that position.

The interferometer 1 proper is fixedly mounted on the lifting block 26, in such a manner that the cylindrical casing 1b is extended vertically upward from the main casing 1a which is located on the lower side. That is to say, the path of the laser beam is routed in such a manner as to project the laser light beam from beneath toward the reference lens 7 which is located upward of the interferometer 1. The surface plate 21 is bored with a through opening 21a vertically in alignment with the cylindrical portion 1b of the interferometer housing, the opening 21a having an diameter large enough to receive the cylindrical portion 1b therein. A lens support 40 is provided on the surface plate 21 opposingly to and immediately above the opening 21a.

Figure 6:
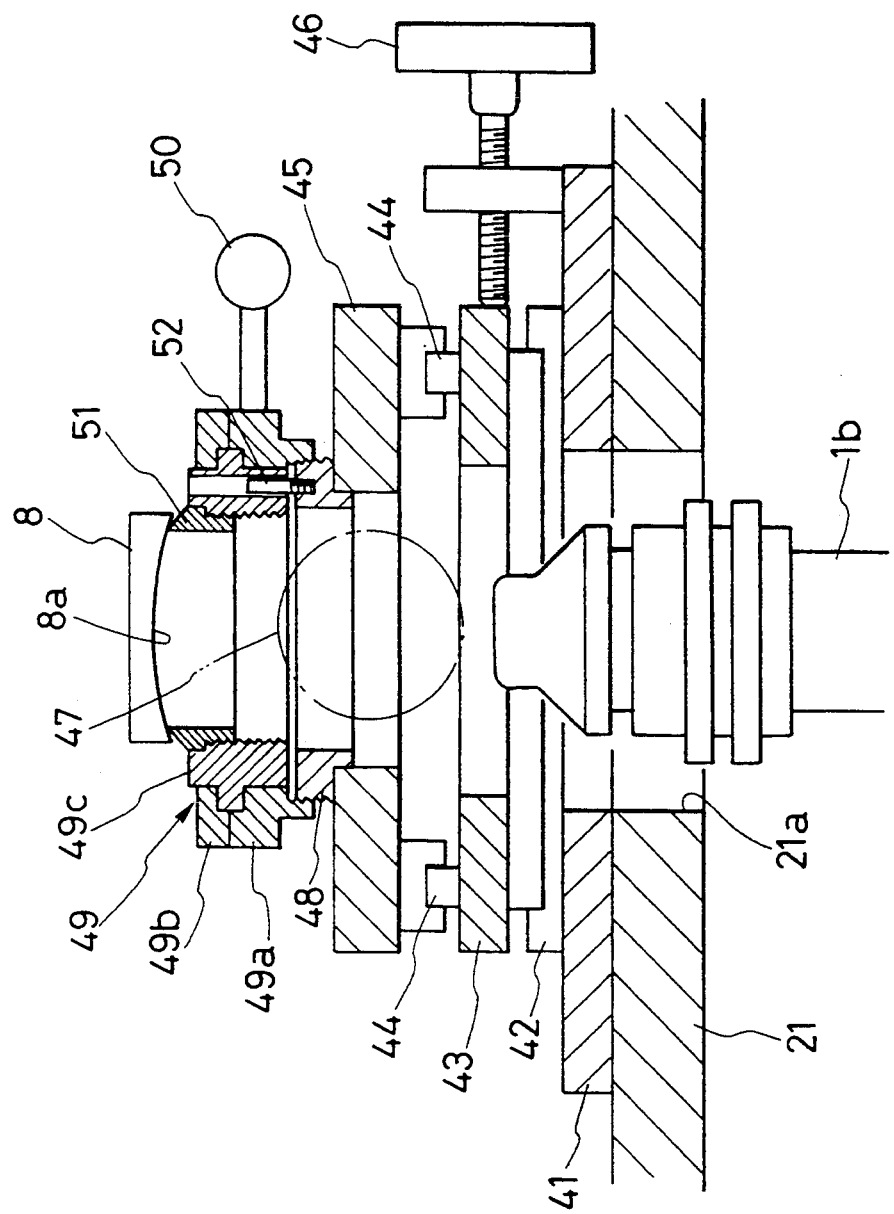
FIG. 6 is a schematic sectional view of a lens support.

The lens support 40 is provided with a horizontal position adjusting means which includes, as clear also from FIG. 6, X-Y tables consisting of a first table 43 carrying a Y-axis guide rail 44, to be guided along an X-axis guide rail 42 on a base block 41, and a second table 45 to be guided along the Y-axis guide rail 44. Fine adjustments of the positions of the first and second tables 43 and 45, which serve as X-Y tables, are possible by way of micrometer heads 46 and 47, respectively.

Further, the second table 45 is provided with a height adjusting means. In this particular embodiment, the height adjusting means includes a height adjusting ring 48 which is securely fixed to the second table 45 by means of a bolt or other suitable fixation means. The height adjusting ring 48 is provided with an external screw thread on its outer surface for threaded engagement with a mount holder 49 which has a lever 40 connected thereto. The height of the mount holder 49 is thus adjustable by turning the lever 50. Threaded on the mount holder 49 is a ring-like lens mount 51 to be abutted against peripheral edge portions of an inspecting surface of a lens specimen when the latter is set in position for inspection. For the purpose of preventing the lens mount 51 from being turned along with the mount holder 49 at the time of adjustment of the lens mount height, the mount holder 49 is divided into rotatable members 49a and 49b, and a holder member 49c which is clamped between the rotatable members 49a and 49b and into which the lens mount 51 is directly threaded. The holder member 49 is blocked against rotation by a stopper pin 52 which is mounted on the height adjusting ring 48. The base block 41 as well as the first and second tables 43 and 45 are provided with an opening correspondingly to the opening 21a in the surface plate 21.

Further, an upper support frame 33 which is erected on the machine frame 20 is provided with a horizontal cover rack 34 overhanging substantially coextensively with the surface plate 21, the cover rack 34 supporting a monitor unit 12 thereon. The free space between the monitor rack 34 and the surface plate 21 is preferred to be as narrow as possible within a range which will permit easy setting and ejection of lens specimens on and from the lens mount 51, while letting the cover rack 34 act as an obstacle which keeps the operator's eyes from the lens mount 51. Namely, the rack portion 34 functions as a support for the monitor 12 and at the same time as a safety measure for the operator.

The interferometric surface inspection machine, with the above-described construction, is useful as the so-called Newton's fringe checker to inspect the accuracy of finished spherical lens surfaces on the basis of the Newton's fringe number or the number of lines in the interference fringe pattern in the manner as described below.

Firstly, a reference lens 7, which is designed for the measurement of the Newton's fringe number of lens specimens of a specific F number, is set on the interferometer 1, and on the other hand a lens mount 51, of a size suitable for supporting a lens specimen 8 at peripheral edge portions outside the effective diameter of the lens element 8, is set on the mount holder 49. In this state, a test plate is set on the lens mount 51. The test plate is formed with a surface which serves as an ideal prototype for the finished surface 8a of the lens specimen 8 to be inspected. However, the test plate is not necessarily required to be of the same material as the lens specimen 8.

Now, the positions of the interferometer 1 and test plate are adjusted to ensure that they are in optimum relative positions for the measurement of the Newton's fringe number when a lens specimen is set in position. The adjustment of their relative positions can be made by moving the interferometer 1 in the upward or downward direction through an operation of the up-down guide means 23. In this regard, the adjustment of relative positions needs to be effected in the unit of the light wavelength. For this purpose, firstly the up-down guide means 23 is moved to make a rough adjustment of the relative positions of the interferometer 1 and the test plate, and nextly their relative positions are adjusted to the unit of light wavelength through the afore-mentioned position adjusting means and the height adjusting means. Namely, the position of the test plate is finely adjusted in the horizontal directions through operations of the micrometer heads 46 and 47 which control fine movements of the first and second tables 43 and 45 of the lens support member 40. A fine adjustment of the height of the interferometer 1 can be made by way of the lever 50 of the height adjusting means which is manipulatable to move the mount holder 49 upward or downward in a fine pitch for fine adjustment of the vertical position of the test plate.

While making the adjustment of the above-mentioned relative positions, a laser beam is projected from the laser generator 2 to form an image of light reflections from the reference surface 7b of the reference lens 7 and from the test plate on the image pickup means 11 for display on the monitor 12. The prior adjustment of the relative positions is complete as soon as the image on the monitor 12 comes to a state where the number of lines of the interference fringe pattern fall to a minimal number (ideally fall to zero on the interferometer 1). In this state, the lens mount 51 and the interferometer 1 are in condition for measuring the Newton's fringe number of the lens specimen 8, namely, in condition for a Newton's fringe check. Accordingly, the interferometer 1 and the lens mount 51 are fixed in these positions.

Nextly, the test plate is removed from the lens mount 51 and replaced by a lens specimen 8 to be inspected, and the accuracy of a finished lens surface 8a of the lens specimen is checked by way of the image of the interference fringe pattern which is displayed on the monitor 12 as a result of interference between the light reflections from the inspecting lens surface 8a and the reference surface 7b of the reference lens 7.

In this instance, the lens specimen 8 which is in contact with the lens mount 51 at peripheral edge portions of its inspecting surface 8a can be stably retained in the position for inspection by its own weight acting to hold the lens specimen in abutting engagement with the lens mount 51, without necessitating to resort to a clamp or other fixation means. Actually, the lens specimen 8 is abutted against the lens mount 51 stably at least at three points, but in some cases may not have its optical axis located exactly in alignment with the optical axis of the incident laser beam. However, in the measurement of Newton's interference fringe pattern, the spherical surface 8a of the lens specimen 8 is located uniformly at a distance corresponding to its radius of curvature, from the focal point of the laser beam, so that a slight degree of positional deviation within the plane of the inspecting surface 8a of the lens specimen 8 would not cause any trouble as long as the effective diameter of the lens specimen is within the lens mount 51. This means that the mechanism for the fine adjustment can be simplified to a significant degree because there is no necessity for adjusting the angle of inclination of the lens mount 51 relative to the interferometer 1, that is to say, there is no need for the fine adjustment mechanism for the lens support 40 to include a mechanism for the adjustment of the inclination angle of the lens mount.

In this manner, with the surface inspection machine of the present invention which is arranged to irradiate a lens specimen with a laser beam from beneath, the lens specimen can be set in position simply by placing same on the lens mount 51, without paying much attention to avoid a slight positional deviation of the inspecting lens surface 8a relative to the lens mount 51, which would not make a material difference in the results of inspection as mentioned hereinbefore. It follows that, once the position of the lens mount 51 relative to the interferometer 1 is adjusted by the use of a Newton's gauge, there is no necessity for re-adjusting the relative positions every time a new lens specimen is set on the lens mount. Therefore, it becomes possible to perform the interferometic inspection of the finished lens surfaces 8a of lens specimens automatically by the use of a robot or other suitable pick-and-place means which is adapted to set the lens specimens one after another on the lens mount 51 automatically.

While the lens mount 51 is arranged to permit fine adjustments of its position, the up-down guide means 23 and the lens support 40 which supports the interferometer 1 and the lens mount 51, respectively, are fixedly mounted on the surface plate 21. Therefore, as long as these parts are assembled together with minimal errors, actually the fine adjustment of the lens mount position is barely required or required only in a slight degree which would not cause any material change in the operating position of a pick-and-place means to be used in an automatic operation for setting and ejecting lens specimens successively on and from the lens mount 51. Further, in case the up-down guide means 23 and lens mount 51 are assembled with strict accuracy to guarantee high-precision positioning of the interferometer 1 by the drive means 29 of the up-down guide means 23, it becomes possible to eliminate the fine adjustment mechanism, if desired, providing the lens mount 51 in a completely fixed state in a predetermined inspecting position above the opening 21a in the surface plate 21.

Figure 7:
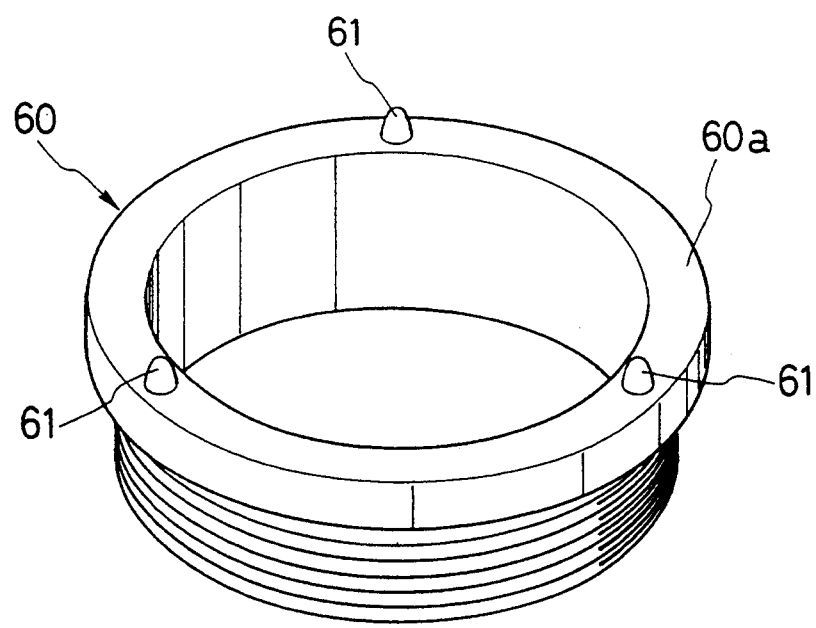
FIG. 7 is a schematic sectional view of a lens support in another embodiment of the invention.
Figure 8:
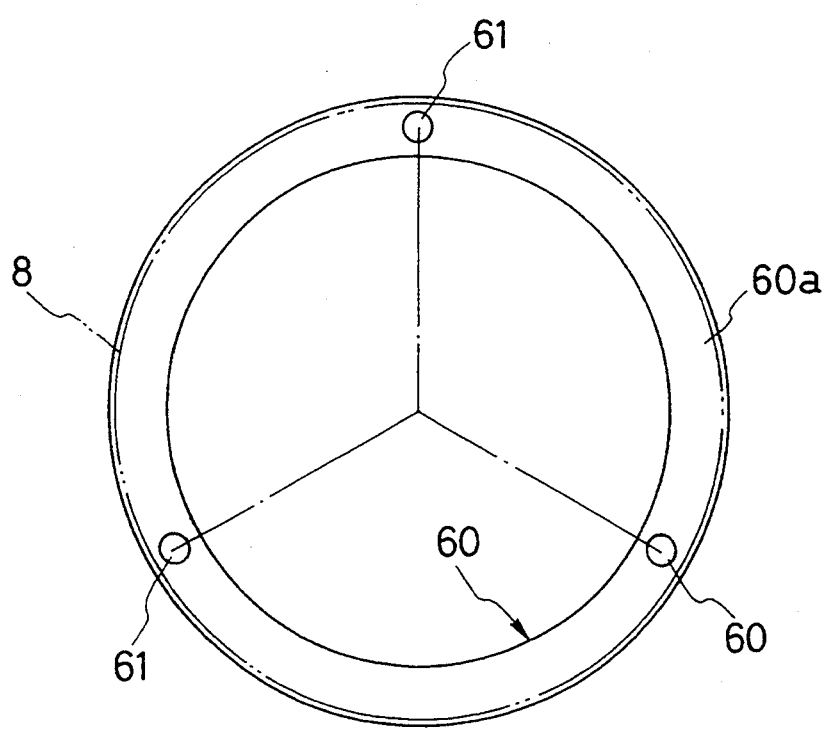
FIG. 8 is a plan view of the lens support shown in FIG. 7.

The above-described embodiment is arranged to support a lens specimen 8 in position by abutting outer peripheral edge portions of the lens specimen 8 on the lens mount 51. In case the lens specimen 8 is a spherical lens element, it suffices to support the lens specimen at three points, for example, by means of three lens support projections which are provided at equidistant positions or at the intervals of 120° on a flat top surface 60a of a lens mount ring 60 as shown particularly in FIGS. 7 and 8. The lens support structure of this sort is simple in construction and yet capable of supporting a lens specimen 8 accurately and stably on the lens mount when the heights of the support projections 61 are adjusted to a correct level relative to each other, permitting to facilitate the lens mount machining process as compared with a lens mount which is adapted to support peripheral edge portions of a lens specimen. In this instance, the lens support projections 61 are preferred to be rounded off at the respective upper ends to preclude the possibilities of causing damages to a lens specimen 8 to be supported thereon.

What is claimed is:
1. An interferometric surface inspection machine, comprising:
   a surface plate formed with a through light guide opening in a predetermined position;
   an up-down guide means suspended from the lower side of the surface plate;
   an interferometer liftably supported on said up-down guide means and having a reference lens with a reference surface thereof disposed on the side of said light guide opening and in face to face relation with said light guide opening; and
   a lens mount adjustably positioned and supported in a predetermined position above the light guide opening in the surface plate and adapted to support peripheral edge portions of a spherical lens element on the side of a surface of said spherical lens element to be inspected.

2. An interferometric surface inspection machine as defined in claim 1, wherein said lens mount is mounted on a fine adjustment mechanism capable of making fine adjustments of the position of said lens mount in horizontal directions.

3. An interferometric surface inspection machine as defined in claim 1, wherein said lens mount is mounted on a height adjustment mechanism capable of making fine positional adjustments of said lens mount in the direction of an optical axis of said interferometer.

4. An interferometric surface inspection machine as defined in claim 1, wherein said lens mount is provided with three lens support projections to support said spherical lens element at three spaced positions in peripheral edge portions thereof.

5. An interferometric surface inspection machine as defined in claim 4, wherein said lens support projections are provided on said lens mount at angular intervals of 120°.

6. An interferometric surface inspection machine as defined in claim 1, wherein an overhanging cover structure is provided above said light guide opening of said surface plate at a predetermined spaced position from said lens mount.

7. An interferometric surface inspection machine as defined in claim 1, wherein said surface plate is mounted on a machine frame through a vibration isolator means.

* * * * *